United States Patent [19]

Lian et al.

[11] Patent Number: 5,731,935
[45] Date of Patent: Mar. 24, 1998

[54] MAGNETIC HEAD POSITIONING DEVICE FOR A TAPE DRIVE

[75] Inventors: Ragnar Lian, Vettre; Lars Simonsen, Nesoddtangen; Guttorm Rudi, Fjellhamar, all of Norway

[73] Assignee: Tandberg Data ASA, Oslo, Norway

[21] Appl. No.: 666,515

[22] PCT Filed: Oct. 27, 1995

[86] PCT No.: PCT/NO95/00199

§ 371 Date: Sep. 10, 1996

§ 102(e) Date: Sep. 10, 1996

[87] PCT Pub. No.: WO96/13833

PCT Pub. Date: May 9, 1996

[30] Foreign Application Priority Data

Oct. 27, 1994 [NO] Norway ............................ 944103

[51] Int. Cl.⁶ .............................. G11B 5/584; G11B 5/55
[52] U.S. Cl. .............................. 360/109; 360/106
[58] Field of Search ...................... 360/109, 77.12, 360/106, 78.02

[56] References Cited

U.S. PATENT DOCUMENTS

| | | | |
|---|---|---|---|
| 4,212,043 | 7/1980 | Baker | 360/109 |
| 4,882,635 | 11/1989 | Sanai | 360/109 |
| 5,247,404 | 9/1993 | Takeda | 360/77.16 |
| 5,280,402 | 1/1994 | Anderson et al. | 360/78.02 |
| 5,590,007 | 12/1996 | Yanagawa et al. | 360/109 |

FOREIGN PATENT DOCUMENTS

| | | |
|---|---|---|
| 0 477 030 | 3/1992 | European Pat. Off. . |
| 0 479 348 | 4/1992 | European Pat. Off. . |
| 0 565 918 | 10/1993 | European Pat. Off. . |
| WO 95/16986 | 6/1995 | WIPO . |

OTHER PUBLICATIONS

Patent Abstracts of Japan, vol. 15, No. 376, p-1255, abstract of JP.A. 3-147514 (Sharp Corp), 24 Jun. 1991.

*Primary Examiner*—Craig A. Renner
*Attorney, Agent, or Firm*—Hill, Steadman & Simpson

[57] ABSTRACT

A head positioning device for positioning a magnetic head of a tape drive wherein the positioning device has a base mounted stationary with respect to a tape circulating past the magnetic head. The positioning device further has a magnet assembly extending upward from the base. The magnet assembly is surrounded by a motor coil which receives electrical current to cause the motor coil to move up and down under influence of the magnet assembly. The device also has a magnet housing substantially enclosing the magnet assembly and the motor coil therein. The magnet housing has a vertical slot arranged on the side of the magnet housing opposite the magnetic head for pass through of a coil holder connected to the coil. Vertical force is transmitted from the coil to the coil holder outside of the magnet housing wherein the coil holder is connected to the magnetic head for vertically positioning the head with respect to the base.

5 Claims, 11 Drawing Sheets

MAGNETIC HEAD POSITIONING DEVICE FOR A TAPE DRIVE

FIELD OF THE INVENTION

The object of the present invention is to provide an actuator solution for adjusting reading/writing heads of tape streamers. Such an actuator will position the active elements of the reading/writing head, so that they take the correct position when reading and writing. With an increasing track density there is a need for bringing forth an accurate servo track tailing since the distance between the tracks becomes smaller and smaller with increasing number of tracks. Due to economic reasons it is at the same time desired to have a few active elements as possible in the reading/writing head. An actuator for head positioning must therefore be able to fine position the reading/writing head controlled by servo signals from for example the tape, said actuator at the same time being able to displace the reading/writing head over the total width of the tape, so that all tracks can be read and written. Up till today these two requirements for displacing the reading/writing head of a tape drive have appropriately been attended to by using a plurality of actuators in combination, or a plurality of channels on the reading/writing head.

The present invention succeeds in both fine adjustment of the head (track tailing) and displacement of the reading/writing head across the complete width of the tape with the same motor. An additional objective has been to reduce the radiation of magnetic field from the electromagnetic motor, so that the tape or the reading/writing head should not be damaged or disturbed by the motor.

PRIOR ART

A linear motor or a "voice coil motor" constitutes a known principle and is used in connection with both actuators and loudspeakers. There are also known various variants including a displaceable magnet. In the present application the motor proper of the actuator is described in the drawings as a "voice coil motor". However, other types of electromagnetic motors can also be used, reference being made to Norwegian Patent Application No. 95.3646, which is regarded as a part of the known technology.

Tape drives represent prior art technology. Reading/writing heads are known, and parallel guiding is a known principle for controlling movement. Servo control of linear motors is regarded as prior art technology—and has been disclosed in a series of text books for tape drives and loudspeakers. There exist a plurality of various manners for making such servo systems. When a specific embodiment has not been included in this patent application, this is due to the fact that it is not important for the invention as regards which one is chosen. Materials which are used in connection with the invention are per se prior art materials, i.e. iron, copper, neodym magnets, ceramics, Liquid Crystaline polymer-plastics and ruby bearings. The publications which were presented in a pre-examination in the Norwegian Patent Office in connection with NO 94.4103 are well known and regarded as not barring the present invention. This relates to EP 0 477 030 A1 to Iwamatsu/Okuda from Sharp. It clearly appears from the drawing and schedule of the publication that the second order dynamic system is based on suspension of leaf springs. Even if these have been made very long, they will not be able to carry out the long and at the same time precise movement as in accordance with the present invention.

Neither is GB 2034956 to Billy Richard Baker to be regarded as barring the present invention, since it therefrom clearly appears that this is a drum head adjustment for a video tape recorder. U.S. Pat. No. 5,182,683 to Yasuo Misuhashi from Mitsubishi Denki also relates to a drum adjustment actuator based on a leaf spring for suspending a voice coil. This actuator has not the necessary flexibility to carry out the movement which is necessary, and is neither regarded as a bar. U.S. Pat. No. 5,247,404 to Munehisa Takeda from Mitsubishi Denki is, due to the same reasons as above, regarded as not representing a bar even if the arrangement of the magnets of the motor is of the same type as in the present invention.

SUMMARY OF THE INVENTION

The specific features of the present invention, which differ from similar and prior art actuators being used within the same or associated applications, are as follows:

The combination of an electromagnetic linear motor comprising:

Parallel guiding rendering a specifically long and free movement, providing for both fast and accurate micro positioning on the individual track of the tape and displacement of the reading/writing head across the complete width of the tape, and all of this within one actuator. The present actuator is aimed for a ¼"–½" taper.

Double servo possibility by receiving the servo signals from pre-formatted tracks on the tape together with servo signals from positioning coil, so that these signals individually and in combination can be used for controlling the actuator.

The application of novel and specifically stiff materials for avoiding undesired deflection in the suspension (Liquid Crystaline polymer and ceramics).

The solution including a linear motor which generates very small stray field values for the magnetic field in the direction wherein the sensitive reading/writing head and the tape are present.

It is included in a first order regulating system.

BRIEF DESCRIPTION OF THE DRAWINGS

FIG. 12b is a side view of the arrangement of FIG. 12a;

DETAILED DESCRIPTION OF THE PREFERRED EMBODIMENTS

The present invention is a first order actuator system.

Figure 1:
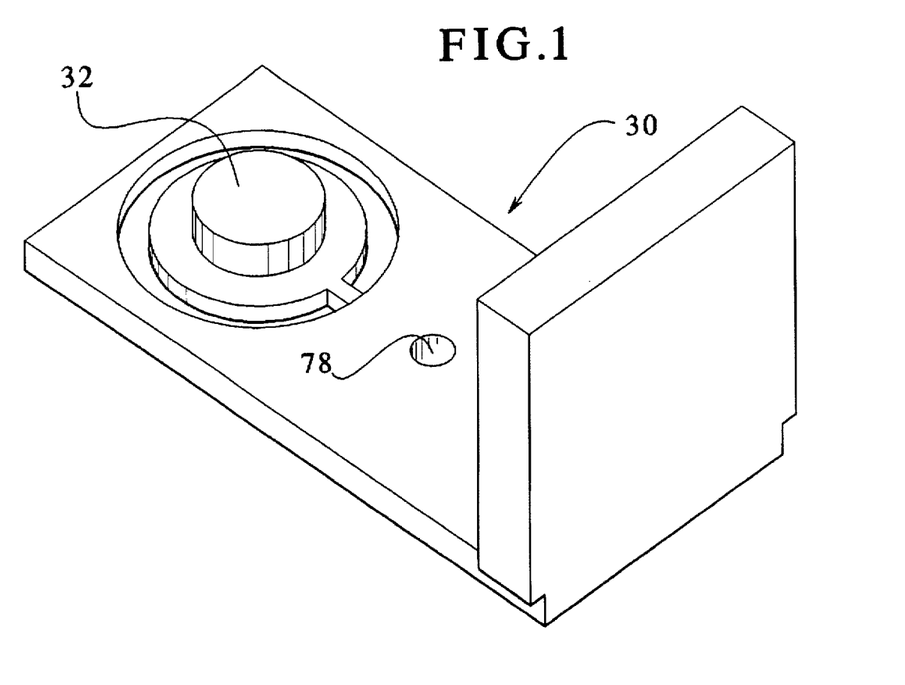
FIG. 1 is a perspective view of a base of the present invention.

As shown in FIG. 1 the invention comprises a base iron 30 serving as a carrier of a magnet system of a motor and serving as an anchoring to the tape drive. The arrangement comprises adjustment points in order to align Azimuth and Zenith in relation to the tape. On the base iron 30 according to FIG. 1 a magnet 32 according to FIG. 2 will be arranged, stacked onto the magnet is a pole shoe 33, and on the pole shoe is stacked another magnet 34, so that said magnets 32, 34 will have N—N or S—S toward each other. Thereby the magnetic field will in all essentials be concentrated in the motor. In order to close the iron path for the magnetic field, a magnet housing 36 according to FIG. 3 and a housing top 38 will be placed on the FIG. 2 magnet. Coils 40 illustrated in FIG. 5 comprise motor coil(s) and in FIG. 13 there are illustrated positioning coil(s) 42 which are assembled in the FIG. 4 arrangement and attached in a coil holder/head mount 44 with glue.

Figure 3:
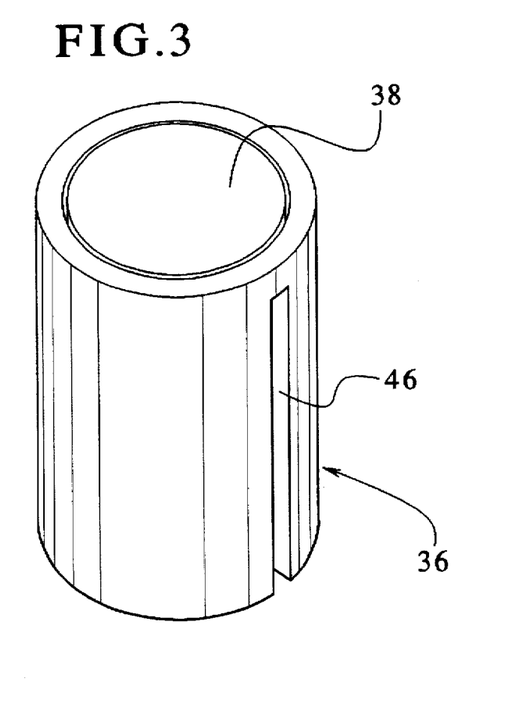
FIG. 3 is a perspective view of a magnet housing of the present invention.

The supply wires can pass through a gap 46 illustrated in FIG. 3, through the magnet housing 36, and attachment to coil holder/head mount 44 is by means of glue.

According to the present invention, the magnet system renders an embodiment including two symmetrically arranged magnets in a closed magnet system. The magnets are so arranged that 100% of the flux from the magnets is concentrated in the circular air gap in which the coil is to be displaced. This is done by mounting the magnets N—N or S—S.

Figure 5:
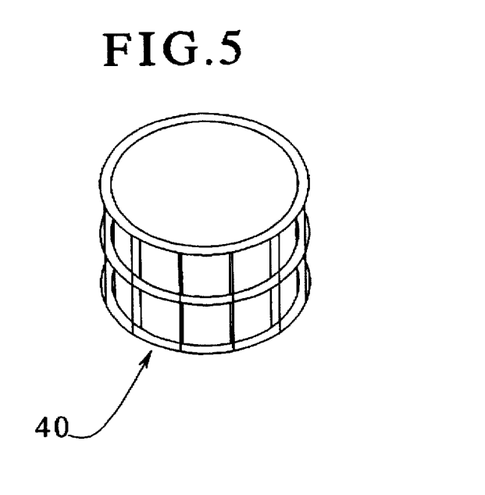
FIG. 5 is a perspective view of a motor coil of the present invention.
Figure 6:
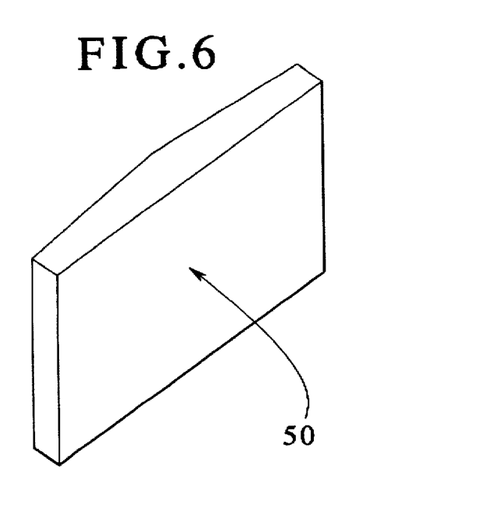
FIG. 6 is a perspective view of a magnetic head of the present invention.

The closed design of the magnet system includes the narrow gap opening 46 facing away from a reading/writing head 50, see FIG. 6, so that the distribution of the magnetic field to the reading/writing head will be very small, in the range of 2–5 Gauss which is illustrated by the field lines in a simulated graph. When alternating current is supplied to the coil 40 of FIG. 5, the latter will move in accordance with the direction of the current. The position can therefore be decided with the applied signal.

The displaceable coil 40, or the plurality of coils as illustrated by the design, is or are attached to the coil carrier 44 which at the same time is a support for the head 50.

Figure 2:
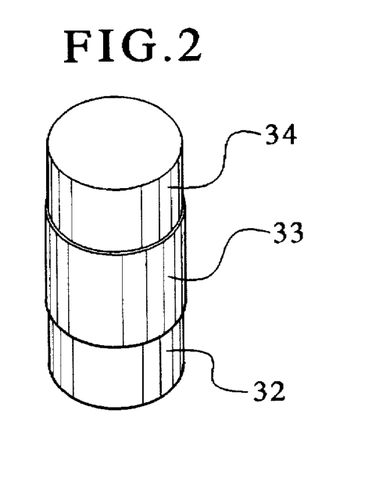
FIG. 2 is a perspective view of a magnet assembly of the present invention.
Figure 4:
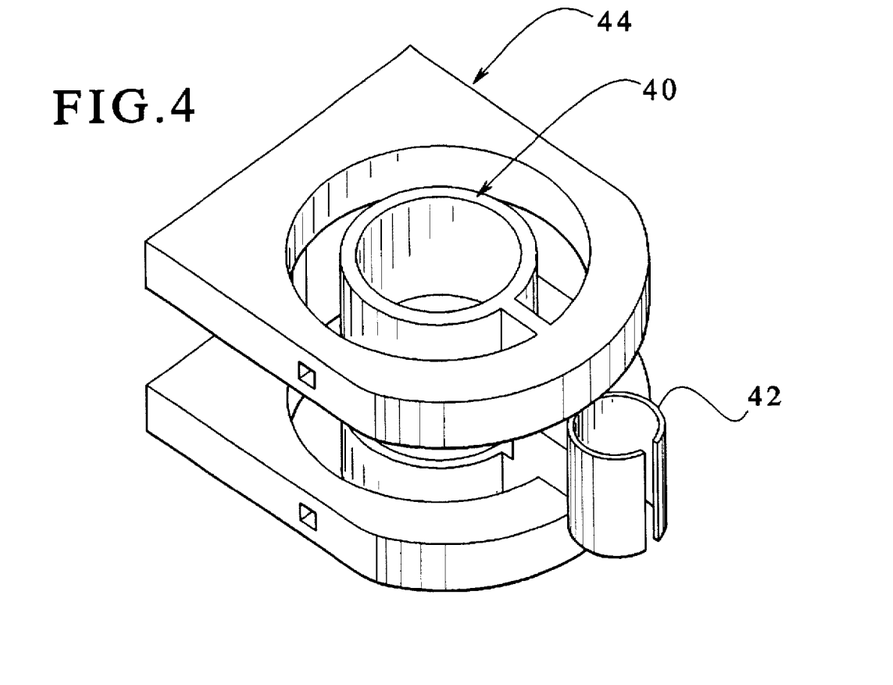
FIG. 4 is a perspective view of a coil holder of the present invention.
Figure 7:
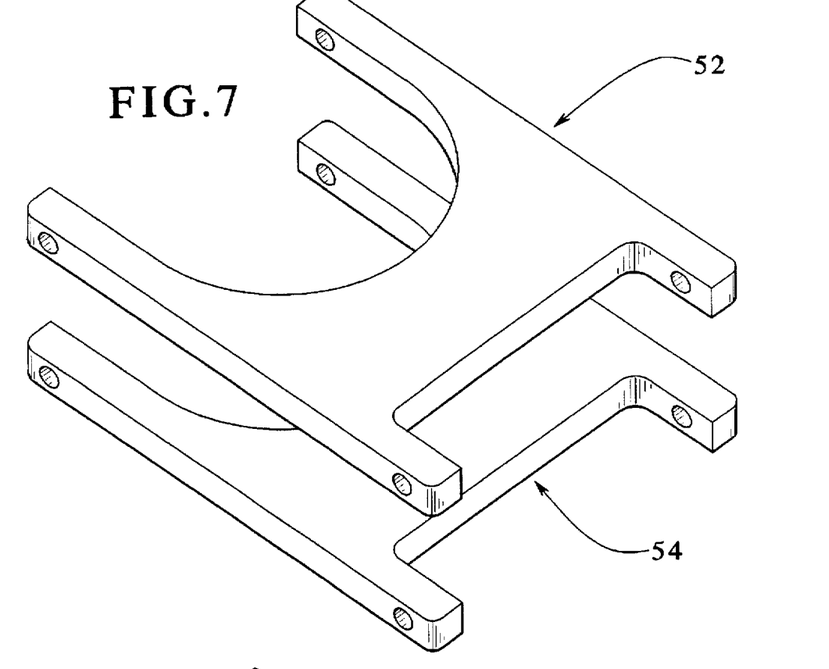
FIG. 7 is a perspective view of linker arms of the present invention.
Figure 8:
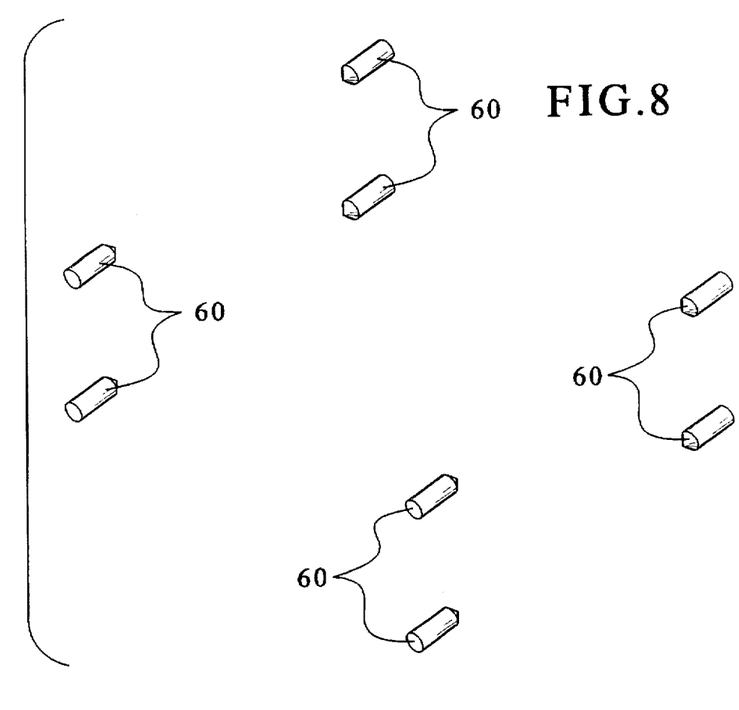
FIG. 8 is a perspective view of a needle bearing arrangement of the present invention.
Figure 9:
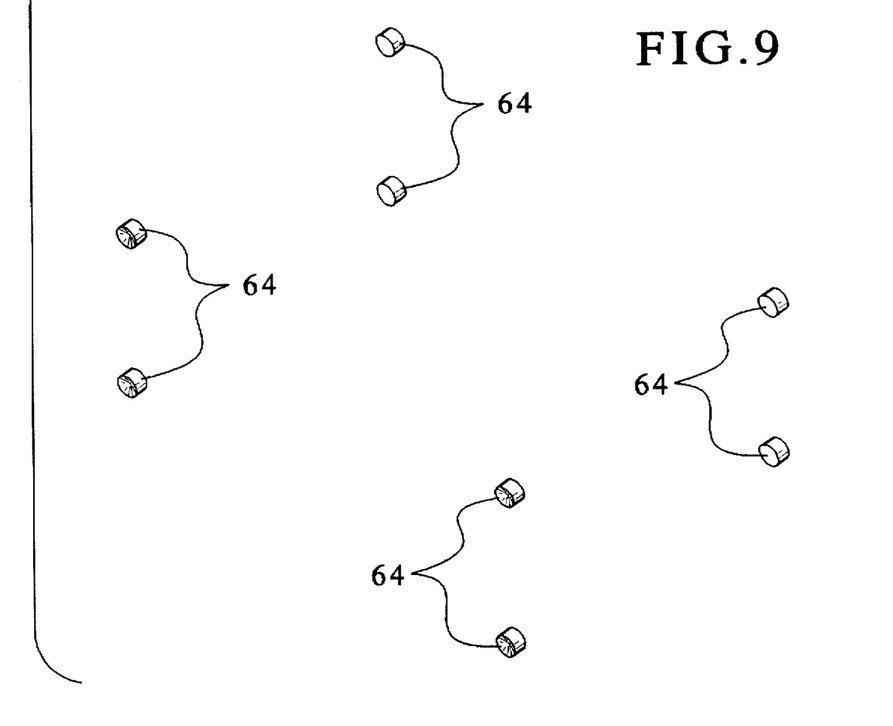
FIG. 9 is a perspective view of a bearing arrangement of the present invention.
Figure 9A:
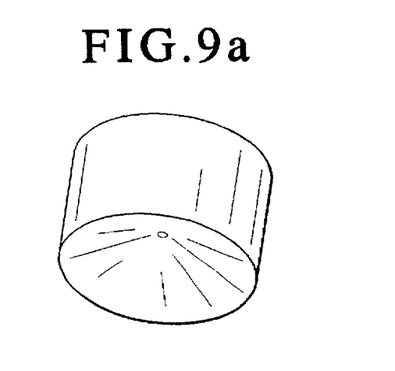
FIG. 9a is an enlarged perspective view of one bearing from FIG. 9.
Figure 10:
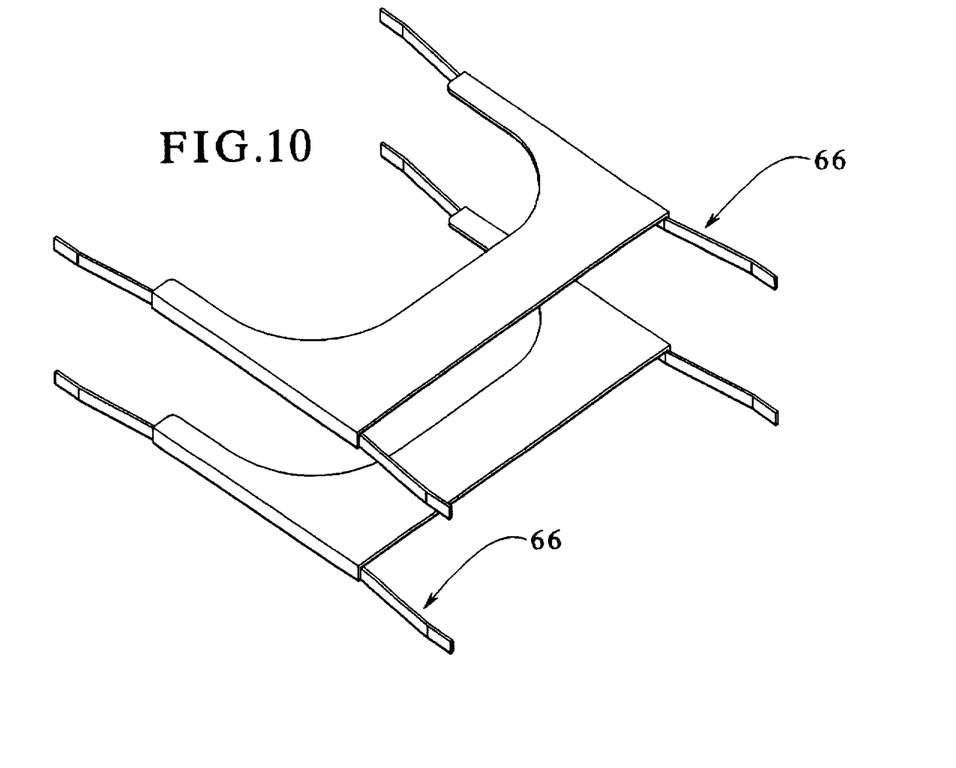
FIG. 10 is a perspective view of leaf springs of the present invention.

The coil 40 is guided in its air gap, between the housing 36 shown in FIG. 3 and the magnet 32, 34 shown in FIG. 2, by a parallel guiding comprising linker arms 52, 54 as illustrated in FIG. 7. The linker arms 52, 54 are suspended from the iron base 30, and from the coil holder 44 as illustrated in FIG. 4, by means of needles 60 in each end, see FIG. 8 needles 60. These needles 60 traverse the linker arms 52, 54 and are pressed into their bearings 64 as illustrated in FIG. 9. The needles must have a small diameter in order to provide a large friction force ratio. They are in the drawings designed as ruby clock bearings (pin bearings), wherein the pins are kept in by means of leaf springs 66, see FIG. 10, or "plate springs". The stress on this leaf spring 66 will determine the power which can be effected sideways on the head 50, see FIG. 6, without obtaining "Azimuth" error, or an angular displacement in relation to the direction of movement on the tape. The ruby bearings 64 are attached by means of glue and are adjusted to the correct position by mounting linker arms 52, 54. Thereby said elements will be self-adjusting during the mounting. Alternatively, this parallel guiding (FIG. 7, linker arms 52', 54') could be designed as a blade bearing 70, see FIG. 11 or FIG. 12 with linker arms 52', 54' in ceramics and a spring 74, see FIG. 11, in between to keep the same together. This will also provide a very stable guiding including small friction.

The linker arms 52, 54, 52', 54' must in all embodiments (FIG. 7, FIG. 11, FIG. 12) be sturdy and light. The linker arms can be manufactured from bent steel, ceramics or press moulded light metal. Possibly, also a very sturdy reinforced plastics, for example PPS or Liquid crystalline polymer including carbon, may be used.

Figure 11A:
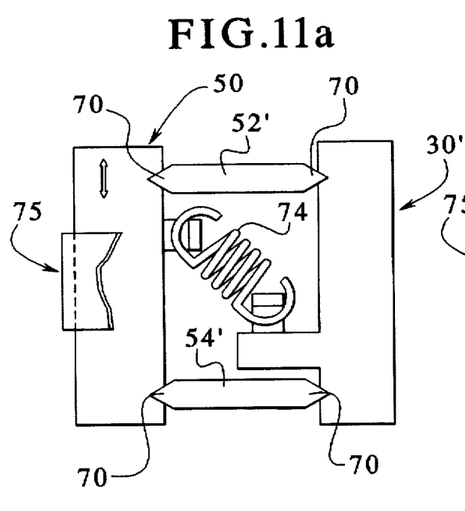
FIG. 11a is a schematic elevational view of an alternate embodiment parallel guiding of the present invention.
Figure 11B:
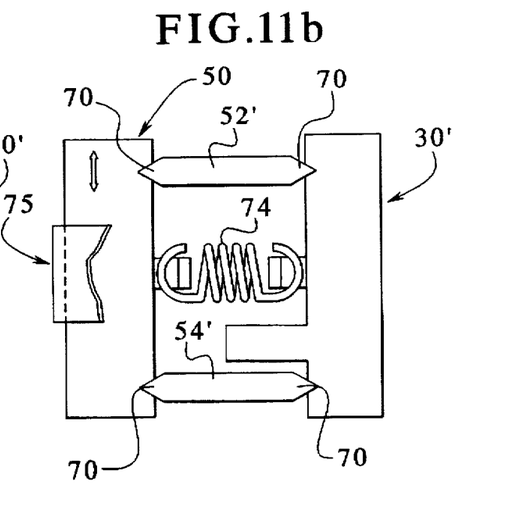
FIG. 11b is a schematic elevational view of a further alternate embodiment parallel guiding of the present invention.
Figure 12A:
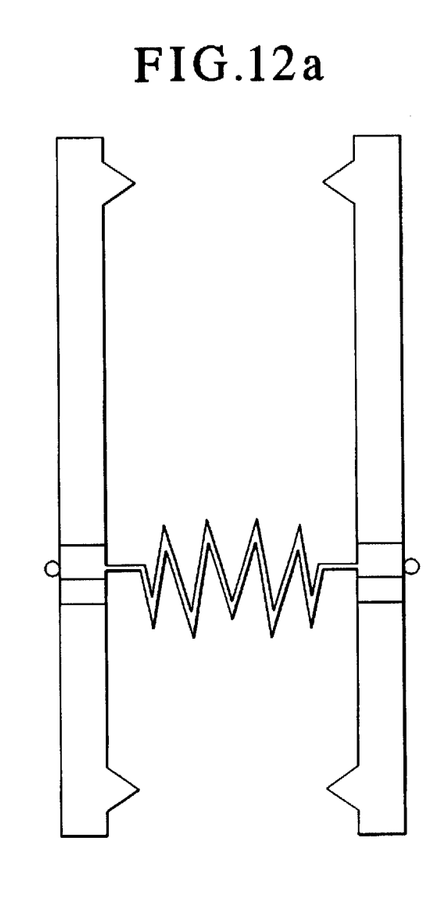
FIG. 12a is a top plan view of an alternate embodiment linker arm arrangement.
Figure 12B:
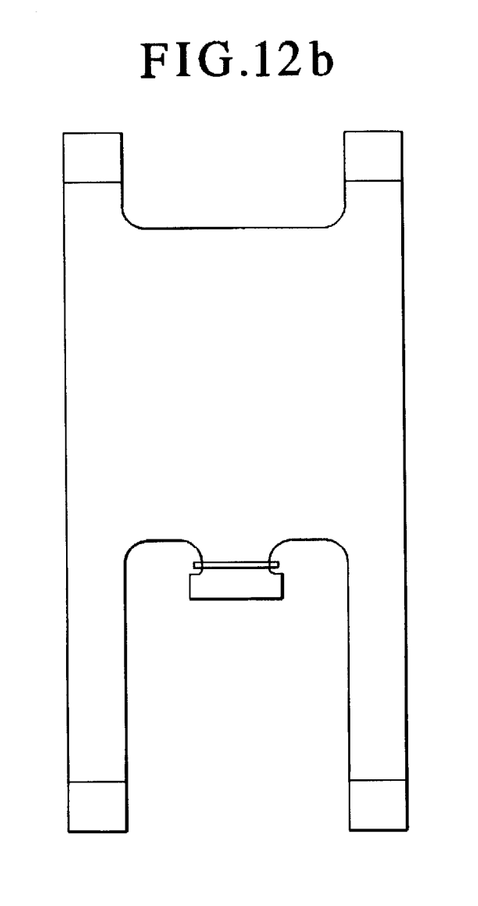

FIG. 11a shows the arms 52', 54' adjusting the head 50 with respect to tape 75 from a base 30'. FIG. 11b shows alternate anchoring points for the spring 74 on the base 30'.

The manner in which the parallel guiding is designed will render thereto a small offset perpendicularly to the tape surface. With a 23 mm bearing spacing this will in the present design render approximately 0.2 mm offset including 8 mm total displacement length. This is allowed for in the motor and the efficiency will be effected only insignificantly.

Here, one can enjoy the symmetrical design including two magnets, see FIG. 2, rendering in its outspring a stronger motor than conventional voice coil motors. This offset can be reduced with longer linker arms. By designing the system with two motor coils 40, see FIG. 5, this will render the possibility of driving the motors longer or control each coil so as to divide the current between said two coils.

Figure 13:
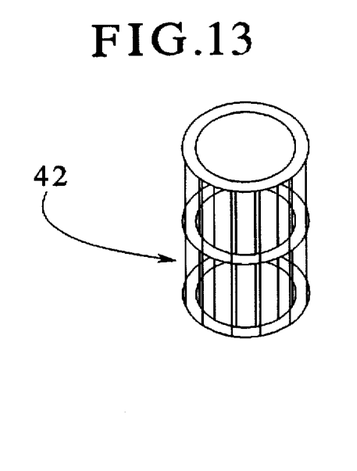
FIG. 13 is a perspective view of a positioning coil of the present invention.
Figure 14:
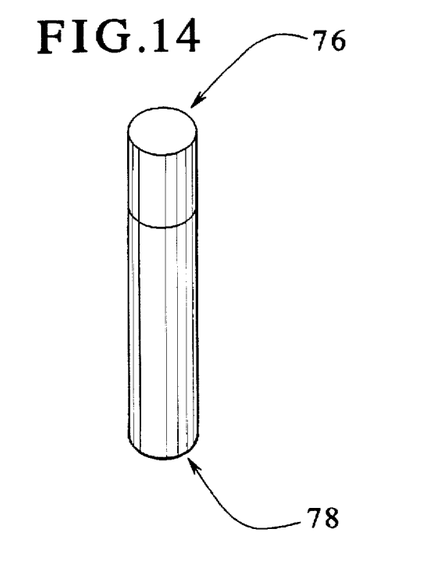
FIG. 14 is a perspective view of a ferrite with support of the present invention.

Aside from the motor coils 40, the system comprises one or more sensor coils 42, see FIG. 13, which register position. Said coils 42 move up and down and a ferrite 76 moves in and out of the coils 42, see FIG. 14, the ferrite 76 attached to a plastic rod 78, in the iron base 30 according to FIG. 1. Thereby the variation in inductance can be utilized as a position indicator and render the possibility for servo operation. This combination including its own positioning system on the motor opens up for the possibility of driving double servo. Both servo including feedback information from the tape (medium) and feedback information from said two sensor coils 42, on the actuator.

Depending on the track width of the tape, it will then be possible to go from micropositioning (track tailing) on one track at the lower edge of the tape, to a new track at the upper edge of the tape, directly, by utilizing the actuator sensor as an absolute indicator.

This sensor system must then firstly be calibrated, which can be put in as a routine in each individual tape drive. The accuracy needs not to be built into the mechanical construction of the sensor system of the actuator. The actuator sensor 42, 76 (FIG. 13 and FIG. 14) can also be utilized as a lock for the actuator when the current to the coils 40, is on. The complete actuator must be set with its correct angles in relation to the tape (Azimuth—longitudinally of the tape, and zenith—transversely of the tape). This can be done by having an affixing screw at the bottom of the actuator (into the iron base 30, see FIG. 1) which is spring loaded, and having three supporting points including adjustment screws going up towards defined points on the bottom side of the iron base 30.

Figure 15:
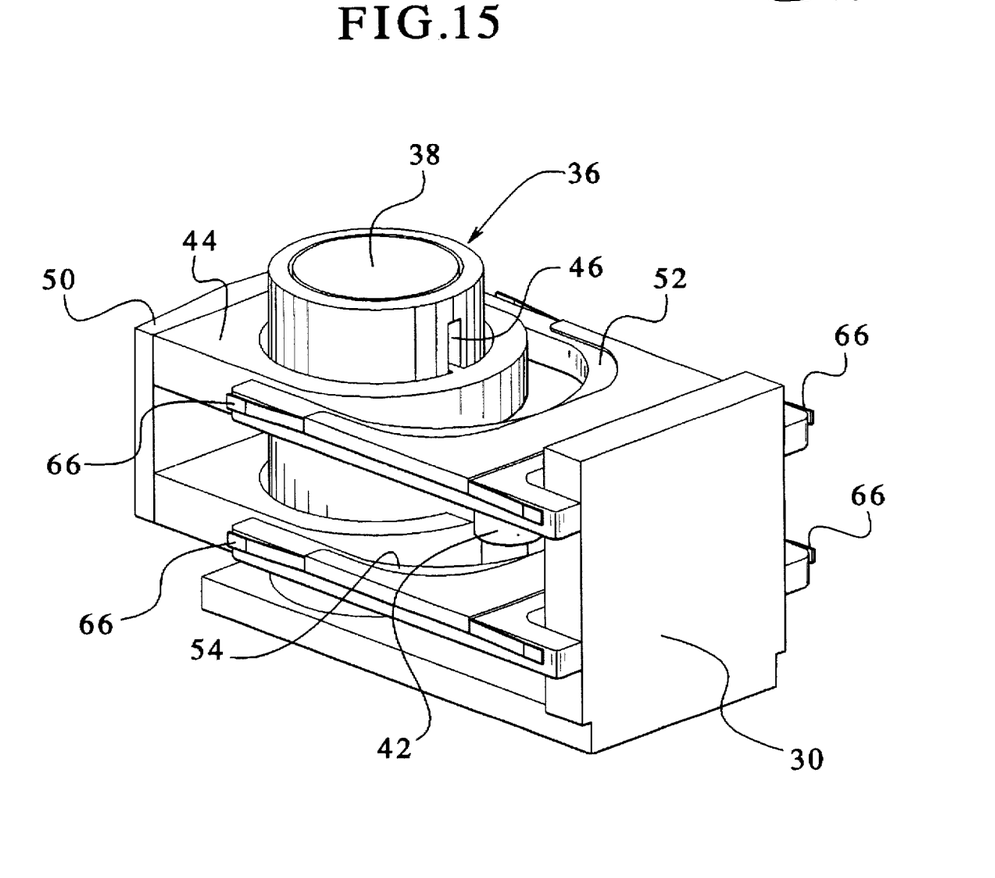
FIG. 15 is a perspective view of the head positioning assembly of the present invention.
Figure 16:
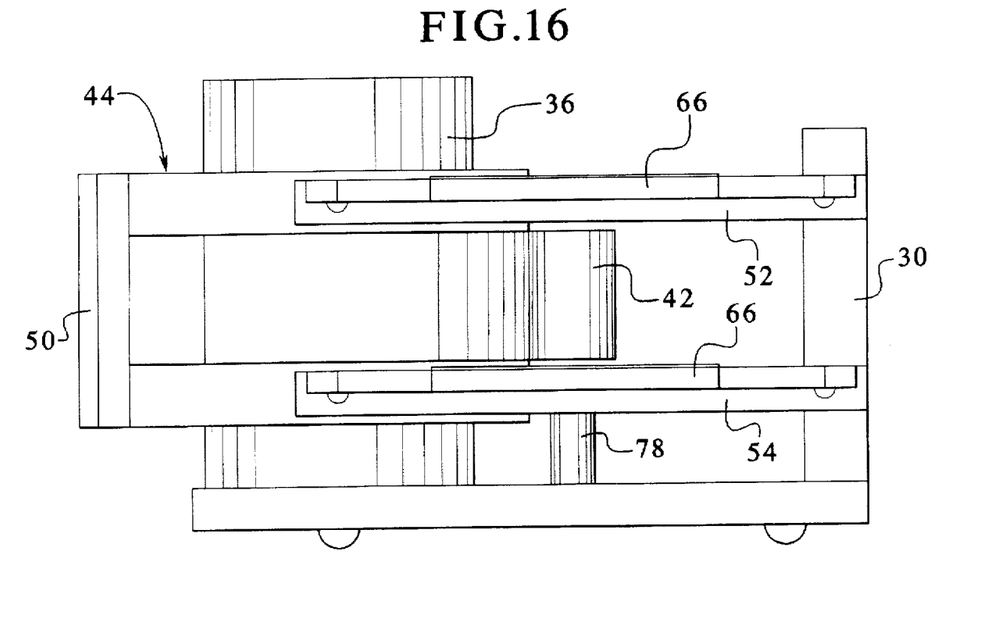
FIG. 16 is a side view of the assembly of FIG. 15.
Figure 17:
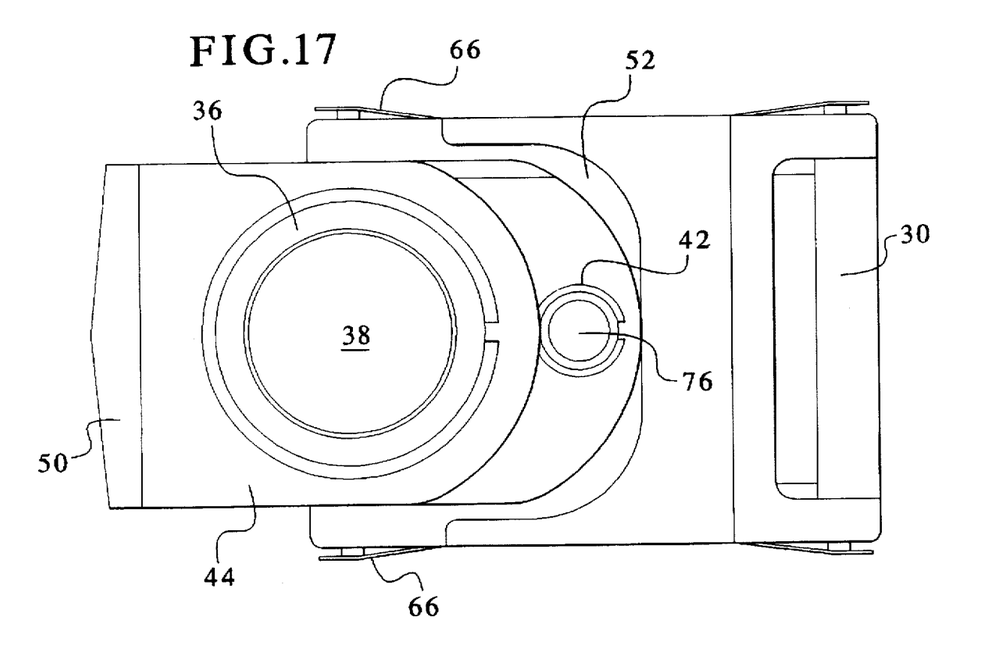
FIG. 17 is a top plan view of the assembly of FIG. 15.
Figure 18:
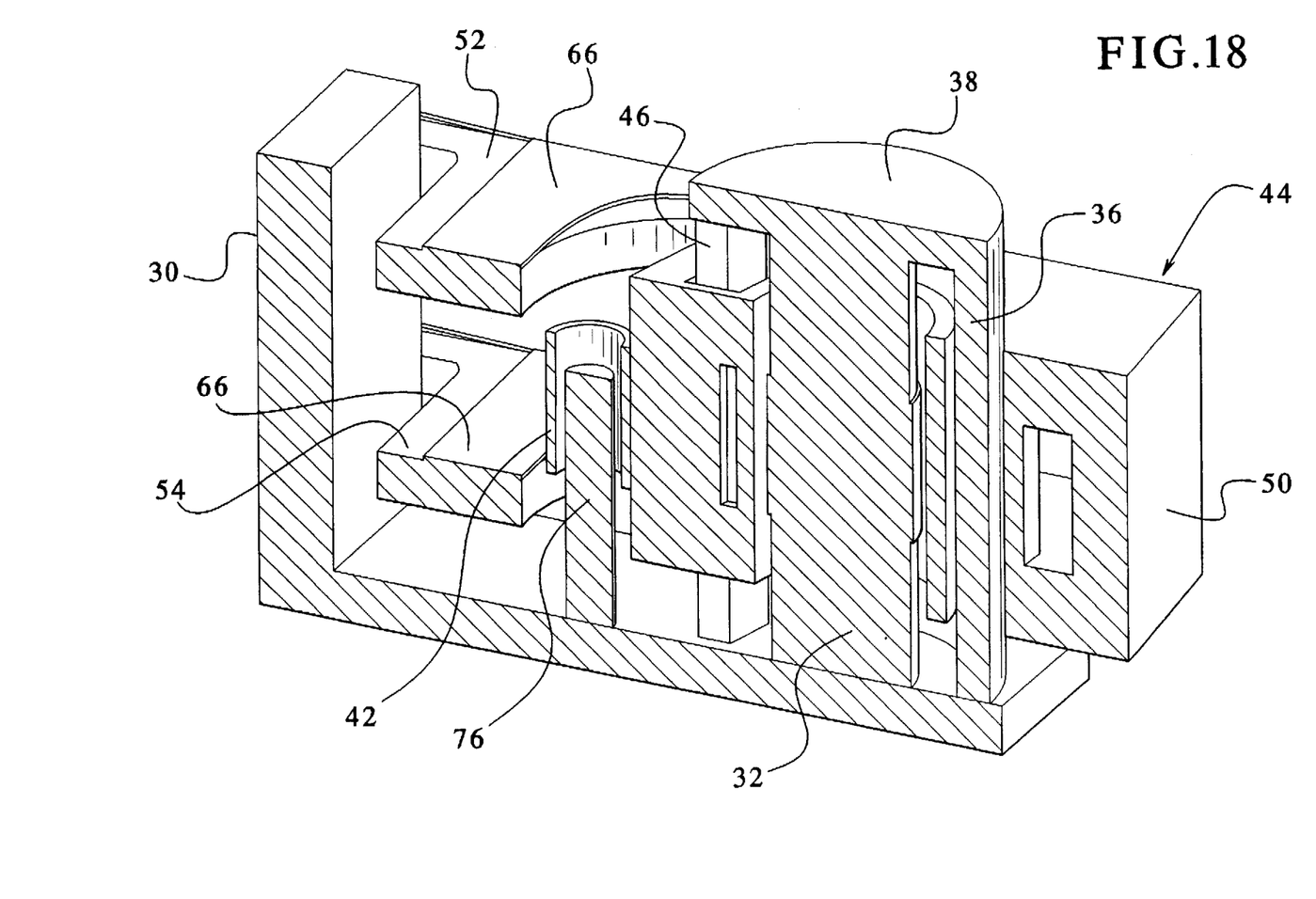
FIG. 18 is a longitudinal sectional view through the assembly of FIG. 15.
Figure 19:
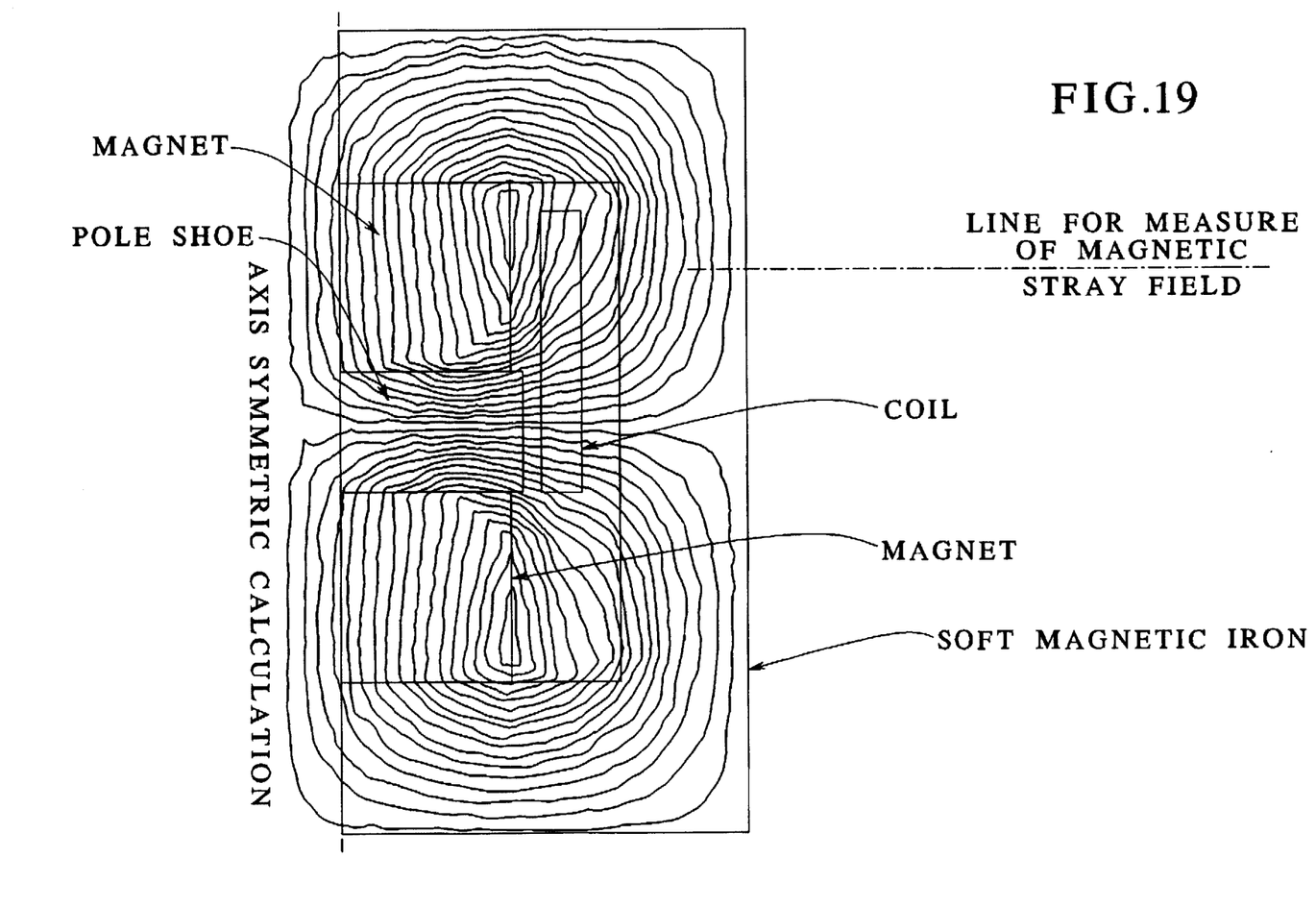
FIG. 19 is a graphical view of the magnetic field liner in the motor of the present invention.
Figure 20:
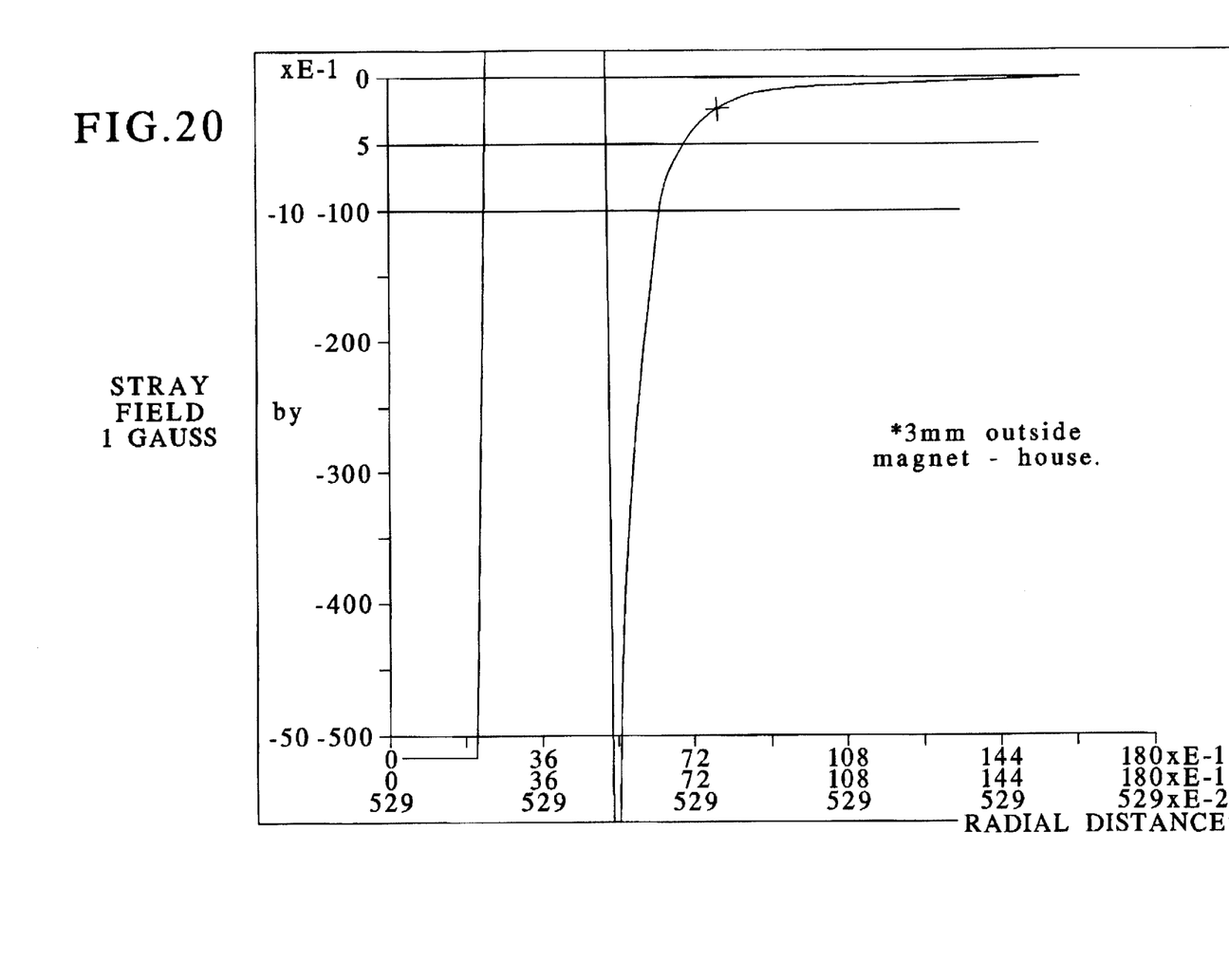
FIG. 20 is a graphical representation of the stray field liner of the present invention.

FIGS. 15, 16 and 17 illustrate the assembled actuator in an isoview, side view and top view, respectively. FIG. 18 illustrates a section through the assembled actuator taken in the longitudinal direction. FIGS. 19 and 20 illustrate the simulation of the stray field from the motor comprising double magnets.

The present actuator meets the requirements for following preformatted tracks on the tape combined with movement in transverse direction of the complete tape, by the present embodiment of the invention. With small variations the same concept may be realized by using small variants of material or arrangements of linker arms, or in motor type selection.

This specific variant is specifically characteristic in the design of the parallel guiding (linker arms) comprising ruby bearings, and by the motor selection including two magnets and two coils.

Within the same structural design the following different variations can be contemplated in a first order system and encompassed by the invention.

a) Comprising movable coils(s) as illustrated in the drawings.

b) Comprising movable magnet, round with radial magnetizing or flat magnet with axial magnetizing.

c) Comprising a) or b) and parallel guiding comprising ruby pin bearing.

d) Comprising a) or b) and parallel guiding comprising blade bearing of ceramics or some other specifically stiff and wear resistant material.

Although the present invention has been described with reference to a specific embodiment, those of skill in the art will recognize that changes may be made thereto without departing from the scope and spirit of the invention as set forth in the appended claims.

We claim as our invention:

1. For a tape drive having tape circulating past a magnetic head, the tape moving longitudinally in a generally horizontal direction, a head positioning device, comprising:

a base mounted stationary with respect to said tape;

a magnet assembly extending upward from said base;

a motor coil surrounding said magnet assembly and receiving a selective electrical current to cause said motor coil to move up and down under influence of said magnet assembly;

a magnet housing substantially enclosing said magnet assembly and said motor coil therein, said magnet housing having a vertical slot for pass through of a coil holder connected to said coil to transmit vertical force from said coil to said coil holder outside of said magnet housing, said coil holder connected to said magnetic head for vertically positioning said magnetic head with respect to said base, said vertical slot arranged on the side of said magnet housing opposite said magnetic head.

2. The positioning device according to claim 1, wherein said base comprises an upstanding leg and said coil holder is guided by upper and lower parallel linking arms, said linking arms suspended by bearings to said upstanding leg and to said coil holder.

3. The positioning device according to claim 2, wherein said parallel linking arms further comprise a spring means for holding said linking arms engaged into said bearings.

4. The positioning device according to claim 1, wherein said magnet assembly includes: a first magnet held on said base, a pole shoe stacked on said first magnet, and a second magnet stacked on said pole shoe, said first and second magnets having either north poles facing toward each other or south poles facing toward each other.

5. The positioning device according to claim 1, further comprising a positioning coil connected to said coil holder outside of said magnet housing, and a ferrite extending upwardly from said base and registered to pass into said positioning coil, an electrical signal of said positioning coil indicative of position of said coil holder with respect to said base.

* * * * *